3,205,283
SOLVENTLESS LIQUID ORGANOPOLYSILOXANE ENCAPSULATING COMPOSITIONS
Frank J. Modic, Scotia, N.Y., assignor to General Electric Company, a corporation of New York
No Drawing. Filed Dec. 30, 1960, Ser. No. 79,555
6 Claims. (Cl. 260—825)

This invention relates to a solventless, flowable organopolysiloxane which is curable to a tough, clear, transparent, resilient material, to the method of preparing such organopolysiloxane and to the method of curing said organopolysiloxane and encapsulating articles with said organopolysiloxane.

Many articles of commerce require protection from mechanical shock and vibration. This is particularly true of sensitive electronic components and equipments which must be operated at relatively high temperatures, for example, at temperatures of the order of 100 to 175 or 200° C. In the case of many articles of commerce, such as the aforementioned electronic components, it is desirable to protect these materials by "potting" them in a resilient material. While a number of resilient encapsulating or potting materials are known to the art, none of these materials have the combined properties of resiliency, thermal stability, and transparency.

An object of the present invention is to provide an improved organopolysiloxane encapsulating material which is solventless and flowable and which is curable to a thermally stable, tough, clear, transparent, resilient material.

This and other objects of my invention are accomplished by (A) forming a homogeneous mixture of an organic solvent solution of a resinous copolymer of $R_3SiO_{0.5}$ units and $SiO_2$ units and a liquid silanol chain-stopped diorganopolysiloxane and (B) heating said homogeneous mixture at an elevated temperature to remove substantially all of said organic solvent, where R is a monovalent hydrocarbon radical. This process results in a solution having a viscosity about the same as that of the starting silanol chain-stopped diorganopolysiloxane and which can then be mixed with an acidic or basic catalyst and cured either at room temperature or an elevated temperature after being cast about an article, such as an electronic component to be encapsulated.

Resinous copolymers composed of $R_3SiO_{0.5}$ units and $SiO_2$ units are well known in the art and are described, for example, in Patents 2,736,721, Dexter; 2,814,601, Currie, and 2,857,356, Goodwin. These copolymers are prepared by hydrolyzing a hydrolyzable triorganosilane, such as trimethylchlorosilane, with an alkyl orthosilicate, such as ethyl orthosilicate, or the partial hydrolyzate of such alkyl orthosilicate. During the cohydrolysis of these two materials in the presence of a minor amount of water and in the presence of a suitable organic solvent, most of the silicon-bonded chlorine and the silicon-bonded alkoxy groups are replaced by silicon-bonded hydroxyl groups through which the two organosilicon materials condense to form siloxane linkages. The condensed copolymer is generally soluble in the organic solvent and insoluble in the water present in the hydrolysis reaction system and the organic solvent layer therefore contains the resinous copolymer. This organic solvent layer containing the resinous copolymer is separated from the aqueous layer and in some cases washed several additional times with water to provide the resinous copolymer in the organic solvent relatively free of either hydrochloric acid which results from the hydrolysis of the alkanol which results from the hydrolysis. Depending on the particular reaction conditions employed and the reactant ratio, these resinous copolymers of $R_3SiO_{0.5}$ and $SiO_2$ units contain from about 0.1 to 5%, by weight, of silicon-bonded silanol or hydroxyl groups.

In selecting the ratio of the triorganosilane to the alkyl orthosilicate employed in forming the resinous copolymer, the starting reactants are taken in the same ratio as the $R_3SiO_{0.5}$ units and $SiO_2$ units are desired in the final copolymer. In general, the resinous copolymer desirably contains from about 0.3 to 0.8 $R_3SiO_{0.5}$ units per $SiO_2$ unit and therefore this same ratio of units is present in the starting materials.

The organic solvent used in the hydrolysis reaction which forms the resinous copolymer can vary within wide limits. In general, this solvent is either an aliphatic or aromatic hydrocarbon or a halogenated hydrocarbon since these solvents are most readily available commercially. Of particular use as solvents are benzene, toluene, xylene, trichloroethylene, and both aliphatic and aromatic mineral spirits. If desired, the resinous copolymer of $SiO_2$ units and $R_3SiO_{0.5}$ units can be formed from a reaction mixture including a first organic solvent and this solvent can be evaporated from the resinous copolymer to produce a powdery, resinous copolymer. The powdery, resinous copolymer can then be redissolved in a different organic solvent, again using any of the common hydrocarbon solvents. For practices of the present invention, the amount of hydrocarbon solvent in which the resinous copolymer is dissolved can vary within extremely wide limits, satisfactory results being obtained with solutions of the resinous copolymer containing from 10 to 90 percent solids. Preferably, the resinous copolymer solution has a solids content of from about 50 to 70 percent.

The $R_3SiO_{0.5}$ units present in the resinous copolymer are generally those in which the R groups are methyl groups. However, also applicable to the present invention are those $R_3SiO_{0.5}$ units in which the R groups are other monovalent hydrocarbon radicals such as, for example, alkyl radicals, e.g., ethyl, propyl, butyl, octyl, etc. radicals; aryl radicals, e.g., phenyl, naphthyl, xylyl, tolyl, etc. radicals; aralkyl radicals, e.g., benzyl, phenylethyl, etc. radicals; alkenyl radicals, e.g., vinyl, allyl, etc. radicals and cyclic hydrocarbon radicals, such as, for example, cyclohexyl, cycloheptyl, cyclohexenyl, etc. radicals; and various halogenated monovalent hydrocarbon radicals including chloromethyl, chloropropyl, dibromophenyl, etc. radicals. Preferably, where radicals other than methyl radicals are included in the $R_3SiO_{0.5}$ units, the units also contain at least 50 percent of trimethylsiloxane units.

The alkyl orthosilicates employed in the practice of the present invention have the formula:

(1) $$[R'O]Si$$

where R' is a lower alkyl radical or a lower hydroxy alkyl radical, such as methyl, ethyl, propyl, butyl, octyl, hydroxy ethyl, etc. radicals. Preferably, the alkyl orthosilicate employed is ethyl orthosilicate or the partial hydrolysis product thereof.

The silanol chain-stopped diorganopolysiloxane fluids employed in the practice of the present invention are also well known in the art and can be represented as having the formula:

(2) 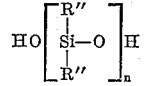

where R" is a monovalent hydrocarbon radical and n has a value of from about 100 to 700. These silanol chain-stopped diorganopolysiloxane fluids have a viscosity of from about 100 to 4,000 centipoises when measured at 25° C. These silanol chain-stopped diorganopolysiloxanes are well known in the art and are described, for example, in Patent 2,843,555, Berridge. Preferably, the silanol chain-stopped organopolysiloxane employed in the practice of the present invention is a silanol chain-stopped dimethylpolysiloxane having a viscosity of from about 300 to 3,000 centipoises when measured at 25° C. When the viscosity is greater than about 4,000 centipoises, the resulting encapsulating fluid is too viscous for use in potting complicated structures.

The resinous copolymer solution and the silanol chain-stopped fluid are mixed together in any convenient fashion. It is found that the resin solution and the silanol chain-stopped fluid are completely miscible so that a uniform homogeneous solution of the resinous copolymer and the silanol chain-stopped fluid in the organic solvent of the resin solution is obtained upon mixing. The solubility of the two ingredients varies to some extent, however, depending on the resin solids content of the resinous copolymer solution. Sometimes mixing for several minutes is required to form a homogeneous solution when a high solids resinous copolymer solution and a silanol chain-stopped fluid are employed. The proportions of the resinous copolymer and the silanol chain-stopped fluids can vary within wide limits. However, for optimum results it is preferred to have from 1 to 10 parts by weight of the silanol chain-stopped fluid per part of resinous copolymer (on a solids basis) in the mixture of the two ingredients.

After forming the solution of the resinous copolymer and the silanol chain-stopped fluid in the organic solvent, the most critical step in the practice of the present invention occurs. This step is the removal of the organic solvent from the solution.

The solvent removal is effected by heating the solution at an elevated temperature such as a temperature of from about 40° C. to a temperature equal to the boiling point of the solvent, which is usually less than about 150° C. Preferably, however, solvent removal is effected by heating the solution at a temperature substantially below 100° C., preferably in the range of 40 to 80° C. while maintaining the solution under reduced pressure, such as a pressure of from 1 to 500 millimeters. By maintaining the solution at this relatively low temperature the chances of premature gelation of the solution are greatly reduced.

Because the solvent has a deleterious effect on the properties of the solventless encapsulating materials prepared by the process of the present invention, it is desirable to remove substantially all of the solvent. By substantially all of the solvent is meant the removal of sufficient solvent so that the resultant solventless fluid contains at most about 2 percent solvent based on the weight of the resinous copolymer solids and the silanol chain-stopped fluid and preferably less than 1 percent solvent by weight on this same basis. In general, solvent removal is effected in a time which varies from about 2 hours to 24 hours, depending on the particular temperature and particular pressure at which the solvent is removed.

Removal of the solvent under the conditions described above from the resinous copolymer solution and the silanol-containing fluid, results in a final solventless fluid encapsulating material which has a viscosity substantially identical to the viscosity of the starting silanol chain-stopped fluid, which viscosity as previously described is in the range of from about 100 to 4000 centipoises when measured at 25° C.

While the exact chemical structure of this resulting solventless fluid material is not known with certainty, it is known that the solution contains a number of silicon-bonded hydroxyl groups or silanol groups. In general, the hydroxyl groups comprise from about 0.1 to 3 percent by weight of the total solventless fluid. The presence of these silicon-bonded hydroxyl groups in the solventless fluid provide reactive sites through which the fluid can be cured after it is cast about an article to be encapsulated. These encapsulating fluids, as previously mentioned, can be cured with either acidic or basic catalysts.

Of the acidic catalysts which can be employed to effect curing can be mentioned, for example, the metal salts of organic carboxylic acids and in particular the organic carboxylic acid salts of metals such as lead, tin, zinc, iron, cobalt, chromium, manganese, etc. The organic carboxylic acid portion of these salts include any of the well known organic carboxylic acids which, in their metal salt form, are conventionally used as paint driers. These acid derivatives include the acetates, octoates, butyrates, naphthanates, etc. Among the preferred metal salt curing agents can be mentioned, for example, zinc octoate, lead acetate, lead octoate, lead naphthanate, and dibutyl tin dilaurate. Where these metal salt curing agents are employed, they are used in an amount equal to from about 0.01 to 2 percent by weight of the metal from which the metal salt is derived.

Among the basic materials which can be employed as curing agents for the solventless encapsulating fluids of the present invention are quaternary ammonium and quaternary phosphonium compounds such as tetramethyl ammonium hydroxide, benzyl trimethyl ammonium hydroxide, tetrabutyl phosphonium hydroxide, etc. However, the preferred curing catalyst employed in the practice of the present invention is the two component curing system described and claimed in the copending application of Merrill Cohen and Charles B. Reilly, Serial No. 79,544, filed concurrently herewith, and assigned to the same assignee as the present invention. The complex catalyst system of this copending application comprises a primary, secondary, or tertiary amine and an epoxy-containing organic compound. This Cohen and Reilly application is hereby incorporated by reference into the present application for complete details as to the nature of this catalyst system. Briefly, however, the primary, secondary or tertiary organic amines comprise compounds such as 1,3-dimethylbutyl amine, dimethyl soya amines, dibutyl benzyl amine, tetramethyl guanidine, N-methylmorpholine, triethanol amine, and dibutyl amine. The epoxy compounds employed in this catalyst system include the glycidyl ethers such as phenyl glycidyl ether, butyl glycidyl ether, the diglycidyl ether of bis-1,3-hydroxypropyl tetramethyldisiloxane, styrene oxide, cyclohexane oxide, as well as resinous materials containing epoxy groups such as the resinous reaction product of epichlorohydrin and p,p′ - dihydroxyphenyldimethylmethane. Where this curing catalyst comprising the primary, secondary or tertiary amine and the epoxy compound are employed, both the amine and the epoxy compound are employed in an amount equal to from about 0.1 to 5 percent by weight based on the weight of the solventless encapsulating fluid with the ratio of the amine compound to the epoxide compound being sufficient to provide from about 0.2 to 5 moles of the amine per mole of the epoxy compound.

The choice of the particular catalyst which will be employed to cure the solventless encapsulating fluids of the present invention will depend on a number of factors. For example, while the metal salt curing agents provide very satisfactory cure of the encapsulating fluids, it is found that the acid residue from the curing catalyst has an adverse affect on certain metal parts, such as copper parts. Thus, when a printed circuit board having copper surface elements is encapsulated in the fluid of the present invention which has been catalyzed with a metal salt, it is found that the acid residue tends to tarnish or discolor the copper elements, thereby adversely affecting both the appearance and the performance of such copper elements. On the other hand, when the material to be encapsulated is already enclosed in some other material, or is formed of some metal such as stainless steel, the acid residue from the metal salt catalysts have no adverse affect on the curing system. The quaternary ammonium compound curing catalysts present certain problems. Thus, these materials are so active that an extremely rapid cure of the solventless encapsulating system is employed so that again a problem exists as to bubble formation in the encapsulating coating. This can be reduced by lowering the concentration of the catalyst but again, this results often in an uneconomical rate of cure. On the other hand, the two component catalyst system of the aforementioned Cohen and Reilly application has been found ideally suited to the curing of the solventless encapsulating solution of the present invention with the rate of cure being suitable so that both thin sections and extremely thick sections, such as sections two or more inches thick, can be cured at a fairly rapid rate without the formation of bubbles in the resulting material.

Because there is a tendency for the solventless encapsulating solution of the present invention to begin cure at room temperature as soon as the catalyst is added, it is desirable to add the catalyst to the encapsulating material just prior to encapsulation of the desired article. In this way, no premature cure of the solventless encapsulating solution is obtained and no shelf life problems are found.

In the encapsulation of articles such as electronic components, it is therefore desirable to add the catalyst to the solventless encapsulating fluid and then to cast the encapsulating fluid around the article to be encased. In order to remove any traces of air or moisture which might have been entrained during the casting operation, it is desirable to subject the cast article to vacuum at a pressure of, for example, 1 to 500 millimeters for about 30 minutes. At the end of this time the cast article is then maintained at room temperature or at some elevated temperature to effect cure of the encapsulated article to form a tough, clear, transparent resilient housing around the article. While cure can be effected at room temperature, it is preferred to employ some elevated temperature such as a temperature of 50 to 150° C. to accelerate the cure. Thus, sections of the encapsulating solution two inches or more thick can be satisfactorily cured at a temperature of about 80° C. in about 10 hours or at a temperature of about 150° C. in about 2 hours. The resulting cured materials have a substantially indefinite life at 125° C. to 200° C.

In some cases it is desirable to provide an encapsulating fluid which will cure to a softer than usual gel. Such a fluid can be provided by modifying the encapsulating fluid with a conventional triorganosilyl chain-stopped linear or branched-chain organopolysiloxane fluid of the type disclosed in Patents 2,469,888 and 2,469,890, Patnode. Desirably these modifying fluids have a viscosity of from about 50 to 5000 centipoises when measured at 25° C. These fluids have the average formula:

(3) 

where R is as previously defined and a has a value of from about 2.003 to 2.040. These organopolysiloxane fluids are employed in an amount equal to up to about 50 percent by weight of the modified encapsulating fluid. In general, for compatability the R groups of the chain-stopped organopolysiloxane are selected to be the same as the R groups of the $R_3SiO_{0.5}$ units or the R'' groups of the silanol-chain stopped organopolysiloxane fluid used in preparing the encapsulating fluid.

The following examples are illustrative of the practice of my invention and are not intended for purposes of limitation. All parts are by weight.

Example 1

A resinous copolymer was prepared by the procedure of the aforementioned Goodwin patent by reacting trimethylchlorosilane and ethyl orthosilicate to form a copolymer of trimethylsiloxane units and $SiO_2$ units in which the ratio of trimethylsiloxane units to $SiO_2$ units was about 0.5 to 1.

A solution was formed of 50 parts of copolymer in sufficient xylene to provide a solution containing 60 percent solids. 83.5 parts of this solution were mixed with 300 parts of a silanol chain-stopped dimethylpolysiloxane having a viscosity of about 3500 centipoises when measured at 25° C. The resulting solution was then heated at a temperature of about 55° C. at a reduced pressure of about 20 millimeters for 5 hours, during which the xylene content of the mixture was reduced to about 0.5 percent based on the weight of the total mixture. The resulting material had a viscosity of about 3500 centipoises when measured at 25° C. and contained 0.1 percent, by weight, of hydroxyl groups. To a portion of this material was added 0.5 percent, by weight, of dibutyl tin dilaurate and the catalyzed liquid was poured inside and around an electronic coil in a container to provide sections of the encapsulating solution up to 2 inches thick. This cast article was then evacuated at room temperature and 10 millimeters pressure for about 30 minutes to remove any entrapped air and moisture and then cured at 150° C. for two hours to provide a clear, tough, transparent, resilient coating about the coil. This material was placed in a 150° C. oven and maintained at this temperature for 72 hours to determine the effect of heat on the assembly. At the end of this time, there was no detectable change in the original characteristics of the cured material.

Example 2

One hundred parts of the resinous copolymer of Example 1 was dissolved in sufficient xylene to provide a 60 percent solids solution. One hundred sixty-seven parts of this solution was mixed with 400 parts of the silanol chain-stopped dimethylpolysiloxane described in Example 1. After removing substantially all of the xylene at 50° C. and 40 mm., the resulting solution was catalyzed with 1 percent, by weight, of lead octoate. This material was poured around a printed circuit board and the poured assembly was then evacuated at room temperature for 30 minutes to remove any entrapped air and moisture and heated for 2 hours at 100° C. to produce a product substantially identical in appearance and characteristics to the product of Example 1.

Example 3

One hundred fifty parts of a solid resinous copolymer containing an average of one trimethylsiloxane unit per $SiO_2$ unit was dissolved in sufficient toluene to provide a 60 percent solids solution. Two hundred fifty parts of this solution was mixed with 250 parts of a silanol chain-stopped dimethylpolysiloxane having a viscosity of 500 centipoises when measured at 25° C. This solution was heated to 65° C. and maintained under a vacuum of about 100 millimeters for 3 hours during which substantially all of the toluene solvent was removed, leaving a clear fluid having a viscosity of about 500 centipoises and containing about one percent by weight hydroxyl groups. This solution was catalyzed with 0.25 percent each of 1,3-dimethylbutyl amine and butyl glycidyl ether and cast about a battery-capacitor electronic flash tube assembly and the cast assembly was then maintained at room temperature under a vacuum of about 50 millimeters for 1 hour to remove any entrained air or moisture. This assembly was then heated at a temperature of 70° C. for 12 hours to produce a tough, resilient, transparent, bubble-free, encapsulated article. The procedure of this example was repeated except that a trimethylsilyl chain-stopped dimethylpolysiloxane having a viscosity of 100 centipoises at 25° C. was used to dilute the encapsulating system. This trimethylsilyl chain-stopped fluid was present in an amount equal to 10 percent, by weight, based on the total weight of the diluted solution. When another battery-capacitor flash tube assembly was encapsulated with this material, the final product was slightly softer than the product of this example.

Example 4

This example illustrates the importance of the use of a solution of the resinous copolymer in the preparation of the encapsulating fluids of the present invention. One hundred parts of a solid, resinous copolymer containing 40 mole percent trimethylsiloxane units and 60 mole percent SiO₂ units was added to 250 parts of a silanol chain-stopped dimethylpolysiloxane having a viscosity of 2000 centipoises at 25° C. and the mixture was heated at 70° C. in an attempt to form a homogeneous solution which could be used as an encapsulating material. After heating this material with agitation for two hours at room temperature, the resin had not dissolved in the silanol chain-stopped fluid but the mixture began to gel, resulting in a material which had a viscosity on the order of 30,000 centipoises and had the appearance of a poorly dispersed solid-liquid mixture.

*Example 5*

Sixty parts of the resinous copolymer of Example 1 was dissolved in 40 parts xylene and mixed with 300 parts by weight of a silanol chain-stopped dimethylpolysiloxane having a viscosity of approximately 2000 centipoises when measured at 25° C. This mixture was heated at a temperature of about 40° C. under a reduced pressure of about 100 millimeters to remove approximately 99 percent of the xylene solvent, resulting in a liquid, flowable encapsulating fluid having a viscosity of about 2000 centipoises when measured at 25° C. and containing an average of about 0.25 percent by weight hydroxyl groups. To 100 parts of this fluid was added 0.25 part of N,N-dimethyl soya amine and 0.25 part butyl glycidyl ether. This catalyzed liquid was then cast around a printed circuit board and the entire cast assembly was maintained in a circulating air oven at a temperature of 80° C. for 10 hours. At the end of this time, the organopolysiloxane encapsulating solution had cured to a firm, rubbery, transparent gel with sufficient resiliency to protect the circuit board assembly from mechanical shock and vibration.

*Example 6*

A solution was formed by dissolving 300 parts of a silanol chain-stopped dimethylpolysiloxane having a viscosity of about 3000 centipoises when measured at 25° C. in a solution containing 300 parts of the resinous copolymer of Example 1 dissolved in 200 parts xylene. The resulting solution was heated to a temperature of about 45° C. at 10 mm. to strip all of the xylene from the mixture except about 1 percent, based on the weight of the stripped solution. A portion of this solution was catalyzed with 0.25 percent by weight of dimethyl soya amine and 0.25 percent by weight dibutyl glycidyl ether, based on the weight of the stripped solution. The catalyzed mixture was then poured into a container and heated at 80° C. for 5 hours. At the end of this time, the cured system had been converted from a flowable liquid having a viscosity of about 3000 centipoises to a solid, transparent, elastic material.

*Example 7*

Four hundred parts of a silanol chain-stopped dimethylpolysiloxane having a viscosity of 3000 centipoises at 25° C. was mixed with a solution of 50 parts of the resinous copolymer of Example 1 in 17 parts of xylene. The resulting solution was stripped under the same conditions as in the preceding example to form a stripped fluid product having a viscosity of about 3000 centipoises and containing less than 1 percent, by weight, solvent. This stripped product contained about 0.5 percent, by weight hydroxyl groups. This material was divided into two portions and 0.6 percent, by weight, of a lead octoate solution containing 6 percent lead was added to one portion. This portion was maintained at 75° C. for 48 hours, during which time a clear, resilient, transparent gel was formed. To the second portion of the solventless encapsulating liquid was added 0.6 part of a 6 percent tin solution of dibutyl tin dilaurate. This catalyzed liquid was heated at 75° C. for 72 hours to produce a transparent, resilient gel.

While the foregoing examples have illustrated many of the variables within the scope of the present invention, it should be understood that many modifications of the present invention are possible within the skill of the art. For example, where desired, fillers can be added to the encapsulating compositions where these fillers will not have an adverse affect on the article being encapsulated. Suitable fillers include silica aerogel, fumed silica, precipitated silica, diatomaceous earth, calcium carbonate and the like.

What I claim as new and desire to secure by Letters Patent of the United States is:

1. The method of preparing a solventless organopolysiloxane encapsulating fluid which comprises (A) forming a homogeneous mixture of (1) an organic solvent solution of a resinous copolymer of $R_3SiO_{0.5}$ units and $SiO_2$ units, where R is a monovalent hydrocarbon radical and where said resinous copolymer contains an average of from about 0.3 to 0.8 $R_3SiO_{0.5}$ units per $SiO_2$ unit, and (2) a liquid silanol chain-stopped diorganopolysiloxane having a viscosity of from about 100 to 4,000 centipoises when measured at 25° C., the organo groups of said diorganopolysiloxane being monovalent hydrocarbon radicals, and (B) heating said homogeneous mixture at an elevated temperature to remove substantially all of said organic solvent.

2. The product prepared by the process of claim 1.

3. The process of preparing a solventless organopolysiloxane encapsulating fluid which comprises (A) forming a homogeneous mixture of (1) an organic solvent solution of a resinous copolymer of trimethylsiloxane units and $SiO_2$ units, said resinous copolymer containing an average of from about 0.3 to 0.8 trimethylsiloxane units per $SiO_2$ unit, and (2) a liquid silanol chain-stopped dimethylpolysiloxane having a viscosity of from about 100 to 4,000 centipoises when measured at 25° C. and (B) heating said homogeneous mixture at an elevated temperature to remove substantially all of said organic solvent.

4. The product produced by the process of claim 3.

5. The process of preparing a solventless organopolysiloxane encapsulating fluid which comprises (A) forming a homogeneous mixture of (1) an organic solvent solution of 1 part by weight of a resinous copolymer of $R_3SiO_{0.5}$ units and $SiO_2$ units, where R is a monovalent hydrocarbon radical and where said copolymer contains an average of from 0.3 to 0.8 $R_3SiO_{0.5}$ units per $SiO_2$ unit, and (2) from 1 to 10 parts by weight of a liquid silanol chain-stopped diorganopolysiloxane having a viscosity of from about 100 to 4,000 centipoises when measured at 25° C. and (B) heating said homogeneous mixture at an elevated temperature to remove substantially all of said organic solvent.

6. The product produced by the process of claim 5.

References Cited by the Examiner

UNITED STATES PATENTS

| | | | |
|---|---|---|---|
| 2,736,721 | 2/56 | Dexter | 260—42 |
| 2,843,555 | 7/58 | Berridge. | |
| 2,857,356 | 10/58 | Goodwin. | |

MORRIS LIEBMAN, *Primary Examiner.*

DANIEL ARNOLD, *Examiner.*